United States Patent [19]

Lenius et al.

[11] Patent Number: 5,124,094
[45] Date of Patent: Jun. 23, 1992

[54] APPARATUS AND METHOD FOR CONSTRAINING A ROTATING TUBE OF MATERIAL

[75] Inventors: Steven J. Lenius, Woodbury, Minn.; John W. Louks, North Hudson, Wis.; Ronald P. Swanson, Maplewood; Eugen Will, Woodbury, both of Minn.

[73] Assignee: Minnesota Mining and Manufacturing Company, St. Paul, Minn.

[21] Appl. No.: 673,287

[22] Filed: Mar. 21, 1991

[51] Int. Cl.⁵ .................................. B29C 47/92
[52] U.S. Cl. .................................. 264/40.2; 264/40.3; 264/564; 264/566; 264/146; 264/310; 425/140; 425/326.1; 425/308
[58] Field of Search .......... 264/40.3, 563-569, 264/146, 310, 40.2; 425/140, 326.1, 387.1, 72.1, 308, 315

[56] References Cited

U.S. PATENT DOCUMENTS

| | | | |
|---|---|---|---|
| Re. 28,959 | 9/1976 | Naito | 29/450 |
| 2,844,846 | 7/1958 | Kronholm | 425/326.1 |
| 3,313,870 | 4/1967 | Yazawa | 264/564 |
| 3,342,657 | 9/1967 | Dyer | 156/163 |
| 3,355,531 | 11/1967 | Barnhart et al. | 264/564 |
| 3,775,523 | 11/1973 | Haley | 264/564 |
| 3,784,347 | 1/1974 | Robinson | 425/326.1 |
| 3,814,785 | 6/1974 | Reade | 425/326.1 |
| 3,976,732 | 8/1976 | Herrington | 264/89 |
| 3,976,733 | 8/1976 | Havens | 264/89 |
| 4,061,707 | 12/1977 | Nohtomi et al. | 264/566 |
| 4,118,453 | 10/1978 | Herrington | 264/89 |
| 4,138,453 | 2/1979 | Segl, Jr. | 264/22 |
| 4,189,288 | 2/1980 | Halter | 425/72 |
| 4,355,966 | 10/1982 | Sweeney et al. | 425/140 |
| 4,388,061 | 6/1983 | Bebok | 425/392 |
| 4,479,766 | 10/1984 | Planeta | 425/72.1 |
| 4,536,365 | 8/1985 | Zwick | 264/558 |
| 4,643,657 | 2/1987 | Achelpohl et al. | 425/72 |
| 4,650,407 | 3/1987 | Taguchi | 425/72 |
| 4,655,988 | 4/1987 | Shinmoto et al. | 264/566 |
| 4,676,728 | 6/1987 | Planeta | 425/387.1 |
| 4,699,580 | 10/1987 | Co | 425/140 |
| 4,728,277 | 3/1988 | Planeta | 425/72 |
| 4,732,727 | 3/1988 | Havens | 264/519 |
| 4,753,767 | 6/1988 | Havens | 264/566 |

FOREIGN PATENT DOCUMENTS

| | | | |
|---|---|---|---|
| 3323817 | 1/1985 | Fed. Rep. of Germany | 425/387.1 |
| 57-95423 | 6/1982 | Japan | 264/567 |
| 58-166026 | 10/1983 | Japan . | |
| 63-151429 | 6/1988 | Japan . | |
| 1553881 | 10/1979 | United Kingdom . | |

*Primary Examiner*—Jeffery Thurlow
*Attorney, Agent, or Firm*—Gary L. Griswold; Walter N. Kirn; Charles D. Levine

[57] ABSTRACT

A constraining structure for an open tube apparatus for continuously producing a rotating elongate strip of material is disclosed. The constraining structure controls expansion of an extruded blown film tube to a desired outer diameter range after the tube is formed. The constraining structure includes a casing positionable around the tube, and an annular sleeve in the casing having a generally cylindrical central passageway adapted to receive the tube to permit movement of the tube along its longitudinal axis in a downline direction. The casing and the sleeve walls define a gas chamber with pressurized gas separate from the passageway. The gas layer along the inner surface of the sleeve is at a sufficiently large pressure to constrain the tube to the desired outer diameter while the tube solidifies and to prevent the tube from contacting the sleeve.

11 Claims, 5 Drawing Sheets

APPARATUS AND METHOD FOR CONSTRAINING A ROTATING TUBE OF MATERIAL

TECHNICAL FIELD

The present invention relates to an apparatus for and a method of constraining a rotating tube of material. More particularly, the present invention relates to an apparatus and method which constrains a rotating and translating tube of extruded material in an open tube process.

BACKGROUND OF THE INVENTION

Numerous types of apparatus for stabilizing a blown film tube are known. Sizing cages which include a cylindrically-shaped shell of small diameter rollers must be positioned above the tube frost line to prevent the tube from sticking to the rollers and creating surface defects. However, this location virtually eliminates any size limiting features of the cages as the tube is already solidified. Internal mandrels over which the tube is physically stretched to a final diameter require an internal heat removal mechanism which makes startup and operation difficult and increasing costs. Contact between the tube and the mandrel also causes surface defects.

Rings of air chambers are described in U.S. Pat. No. 3,976,732 to Herrington and U.S. Pat. No. 4,728,277 to Planeta. In Herrington, a plurality of air rings are positioned around the blown tube and have differing diameters to mechanically define the diameter of the blown tube. The rings form a conical, rather than cylindrical shape which do not provide as stable a film diameter. Planeta discloses a film handling device in which a plurality of stabilizing devices which create axially aligned air rings control the shape of a blown tube. Each device uses two oppositely moving air streams parallel to the tube wall to create a low pressure zone to hold the film in position. This does not produce a sufficiently stable film diameter. U.S. Pat. No. 4,655,988 to Shinmoto et al. discloses a vacuum system. A plurality of air-introducing arms are twisted like a vortex to form a structure in which the internal diameter is physically adjustable like a diaphragm. The air provides a buffer between the arms and the film. However, these complex air-based systems rely on the air to impinge on and flow around the blown tube and do not provide a continuous cushion for the tube.

Size feedback systems measure the diameter of the blown film tube above the frostline and vary the amount of air in the tube interior to control the diameter. These devices monitor the tube diameter with sonar or optical sensors. However, as the tube is formed to its final diameter, this method involves compensating for an error in size which has already occurred. This results in a tube having varying diameter depending on each response of the air control system. Additionally, in all known systems, this is accomplished as part of a sealed tube operation in which the tube is sealed typically at a two roller nip. In these systems, the tube diameter expands or contracts as a result of the air volume and pressure change and measurable diameter changes are required to attain a correcting action. This is not fast or accurate enough to permit the use of these systems with diameter control with open tube systems.

Moreover, these size feedback systems for controlling diameter are inadequate when an internal, imperfect seal or plug is used instead of the two roller nip. The tube diameter responds to very slight changes in internal pressure and volume. None of these pressure control systems can respond quickly and accurately enough to prevent diameter changes due to seal leaks. These systems are therefore unacceptable for use with the imperfect seals of open tube processes. Furthermore, in these methods, process disturbances, such as changes in polymer properties or temperature can result in a larger diameter tube and a slightly lower frost line height.

SUMMARY OF THE INVENTION

A constraining structure locates an extruded blown film tube concentric with an extrusion die and physically prevents the tube from expanding beyond the inner diameter of the constraining structure by controlling expansion of the blown film tube to a desired outer diameter range after the tube is formed. The constraining structure includes a casing that is positionable around the tube, and an annular sleeve in the casing having a generally cylindrical central passageway adapted to receive the tube to permit movement of the tube along its longitudinal axis in a downline direction. The casing and the sleeve walls define a gas chamber with pressurized gas separate from the passageway. The gas layer along the inner surface of the sleeve is at a sufficiently large pressure to constrain the tube to the desired outer diameter while the tube solidifies and to prevent the tube from contacting the sleeve. The gas layer forms an air bearing which precisely maintains a selected constant tube diameter.

The constraining structure can be used as part of an open tube film forming apparatus as described in detail in U.S. Pat. Ser. No. 07/673,285 filed on Mar. 21, 1991, concurrently with this application, the specification of which is incorporated by reference. The open tube film forming apparatus includes a frame, an extrusion die mounted on the frame, a transport mechanism mounted on the frame downline of the extrusion die, and a tube cutter mounted on the frame downline of the transport mechanism. The extrusion die continuously extrudes thermoplastic material from a stationary extruder in the downline direction to form a tube with a central generally cylindrical longitudinal cavity. The transport mechanism includes drive rollers positioned to engage the tube and pull the tube in the downline direction. A driver rotates the extrusion die and transport mechanism together relative to the tube cutter. This provides relative rotation between the tube and the tube cutter. The tube cutter, which is offset at an angle with respect to the downline direction, cuts the tube into a continuous elongate web or strip of the desired width as the tube moves downline. An air seal is mounted on the frame for substantially sealing the tube cavity to prevent air from escaping through the open end of the cavity. A tube pressurizer controls air volume in the central longitudinal cavity of the tube to expand the tube laterally outwardly to within the desired range.

DETAILED DESCRIPTION OF PREFERRED EMBODIMENTS

Figure 1:
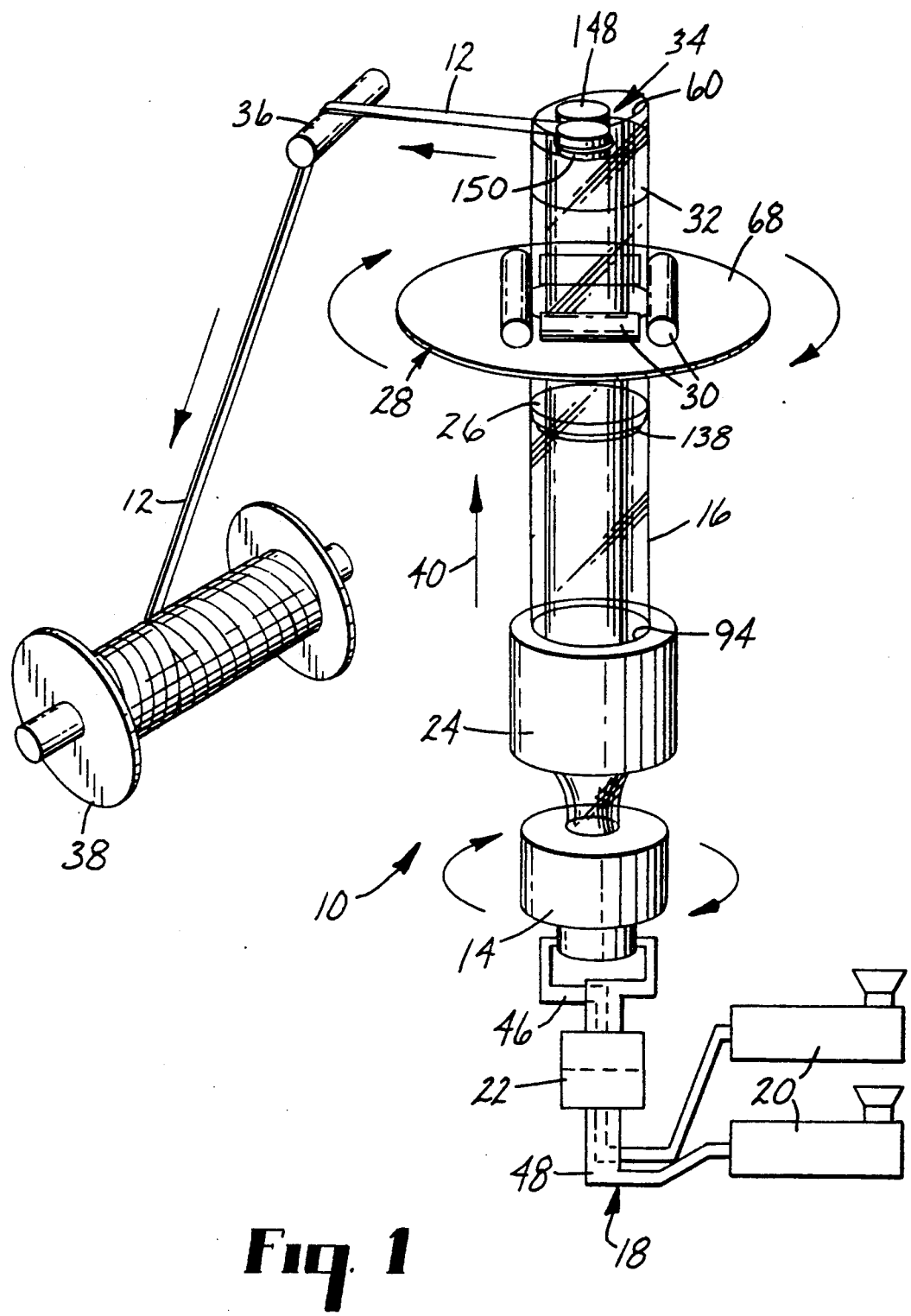
FIG. 1 is a schematic illustration of the primary components of the apparatus of the invention.
Figure 2:
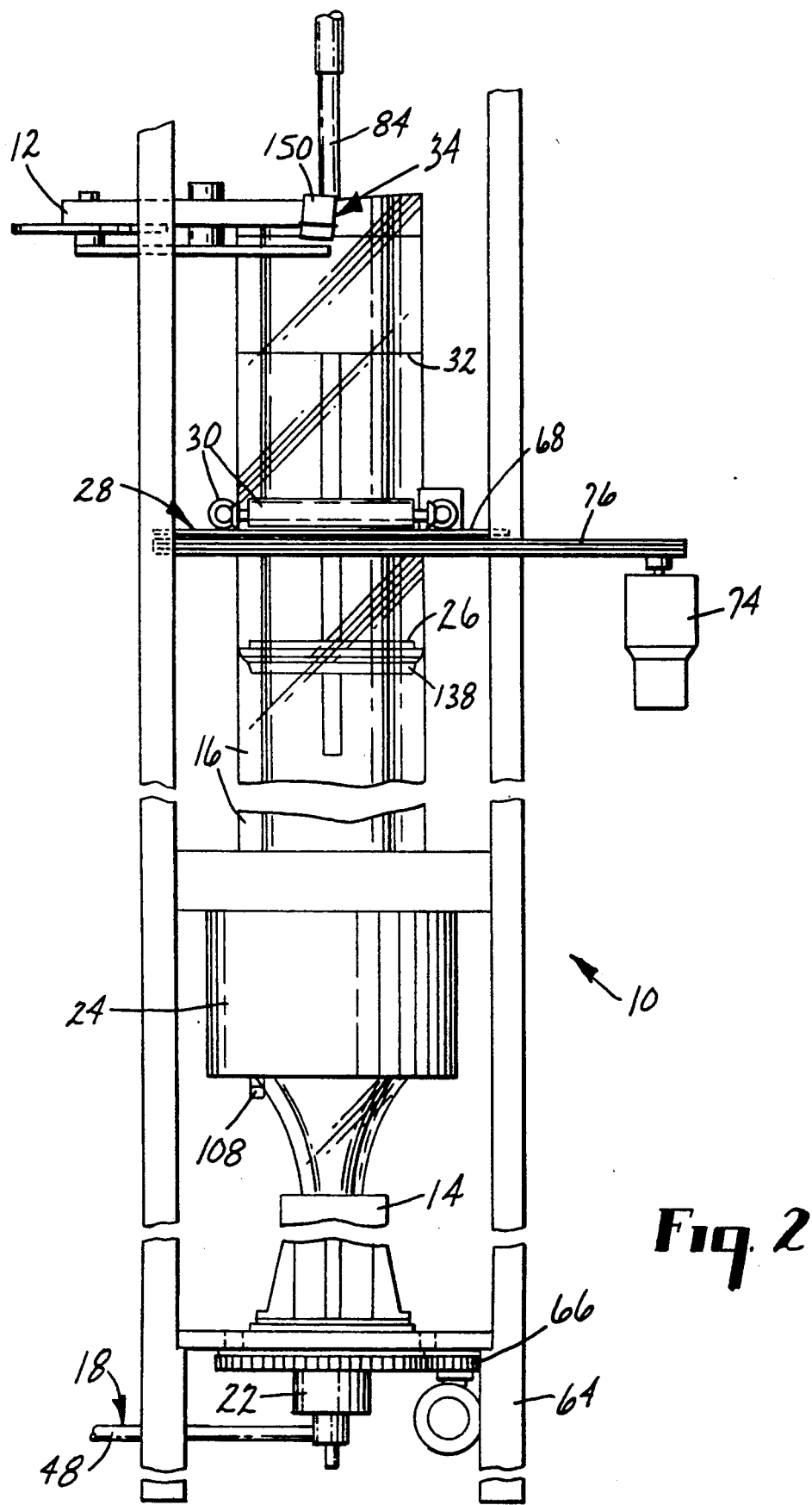
FIG. 2 is a front elevation of the apparatus of FIG. 1, illustrating the arrangement of an extrusion die, constraining structure, air seal, transport mechanism, and tube cutter.

Referring first to the schematic illustration of FIG. 1, apparatus 10 is designed to continuously produce an elongate web or strip 12 of material, including single and multiple layer strips 12, such as adhesive-coated tape. The apparatus 10 generally includes a rotatable extrusion die 14 for extruding a flowable material, such as a thermoplastic polymer material to form a bubble or tube 16. The flowable material travels to the extrusion die 14 via conduits or passageways 18 from one or more extruders 20. A swivel joint 22 permits the passageways 18 to transport material to the extrusion die 14 while it is rotating. Two extruders 20 are used, for example, to produce an adhesive-coated backing. One extruder 20 produces the backing material and the other extruder 20 produces the adhesive material. Upon leaving the extrusion die 14 the tube 16 passes through a diameter constraining device 24 which maintains a constant tube diameter. A lip seal 26 is disposed within the tube 16 downstream of the diameter constraining device 24 and a transport mechanism 28, including a plurality of rollers 30, is located downstream of the lip seal 26. The tube 16 then passes over a mandrel 32 and a slitter or tube cutter 34 cuts the tube 16 into at least one elongate strip 12. The tube cutter 34 continuously cuts the tube 16 into the strip 12 as the extrusion die 14 and tube 16 rotate relative to the tube cutter 34. The strip 12 then passes around an idler roller 36 and is wound on a winder, such as level winder 38.

As used herein, "downline" refers to the general direction that material, e.g., the tube 16, moves when being processed by the apparatus 10. In the figures, the downline direction is upward from the extrusion die 14, as illustrated by the arrow designated by the reference numeral 40 in FIG. 1. Downline does not imply any relationship to vertical or horizontal directions.

The extrusion die 14 may be of a conventional heated design used in blown film processes, and preferably is of the type for co-extruding a multilayer tube 16 having, for example, a polymeric backing layer and a pressure-sensitive adhesive ("PSA") or other adhesive layer along the outside of the tube 16. See U.S. Pat. Nos. 3,342,657; 4,643,657; and 4,753,767; Japanese Kokai No. 63-151429; and British Patent No. 1,553,881 (which are incorporated herein by reference) for descriptions of various blown film extrusion dies.

The extrusion die 14 is rotatable, and may be mounted on the center of a rotating table 42, which is mounted on a frame 44. The table 42 rotates at speeds of up to 115 rpm. A delivery line 46 is located directly below the die at the center of the axis of rotation and is connected to the swivel joint 22. The swivel joint 22 can be any commercially available part used for handling high viscosity fluids at temperatures up to 288° C. (550° F.) and pressures up to $41 \times 10^6$ N/m² (6000 psi) The stationary end of the swivel joint 22 is connected by another delivery line 48 to the stationary extruders 20 so that the flowable material can be delivered to the rotating die 14 from the extruders 20. The die 14 is electrically heated, with the wiring connections being made through the slip ring assembly mounted concentrically to the delivery line and centered on the axis of rotation. This arrangement allows for complete rotation of the die 14 during operation. This rotational motion is transmitted to the extruded tube 16.

The extrusion die 14 preferably includes a mandrel 50 and an annular opening 52 surrounding the mandrel 50. The flowable material is substantially continuously extruded through the annular opening 52 to form a generally cylindrical tube 16, which moves along its central longitudinal axis in the downline direction as the tube 16 is formed. An air passageway 54 is provided through the mandrel 50 and extrusion die 14. One end of the air passageway 54 is in fluid communication with a source 56 of pressurized air via an air conduit 58 and the other end of the air passageway 54 is in fluid communication with the central cavity 60 of the tube 16. Pressurized air is provided through the air passageway 54 to the central cavity 60 of the tube 16 during the initial start-up of the apparatus 10 to inflate and expand the tube 16. The air passageway 54 is sealed with a suitable valve mechanism (not shown) during regular operation of the apparatus 10. The inflation of the tube results in a blown tube as distinguished from a non-inflated tube.

Two stationary extruders 20 may be provided for melting, mixing and delivering the flowable material and any adhesive materials to the extrusion die 14 via the swivel joint 22. These extruders 20 may be of any suitable design, such as a screw-operated extruder having a driven screw that melts and pushes material through a heated barrel for delivery to the extrusion die 14. The extruders 20 do not rotate with the extrusion die 14.

A driver 64 is mounted on the frame 44 for rotating the extrusion die 14 and transport mechanism 28 relative to the tube cutter 34. The tube cutter 34 can rotate while the extrusion die 14 and transport mechanism 28 remain stationary, although it is preferred that the cutter 34 remain stationary while the extrusion die 14 and transport mechanism 28 rotate. This provides relative rotation between the tube 16 and the tube cutter 34 to enable the tube cutter 34 to cut the tube 16 into a substantially continuous web of a desired width as the tube 16 moves downline. The driver 64 can be a DC servomotor with a tachometer which controls the rotation speed of the die by 14 an input voltage signal.

The transport mechanism 28 is mounted on the frame 44 downline of the extrusion die 14 and pulls the tube 16 in a downline direction. The transport mechanism 28 pulls the open tube 16 without distorting or closing the tube thereby allowing access to the tube from the downline side of the tube. Additionally, the transport mechanism 26 drives the tube 16 from the side of an open, flexible tube rather than from the top of a closed portion of the tube as in known methods.

The transport mechanism 28 includes four drive rollers 30 positioned to engage and pull the tube 16 downline. The drive rollers 30 are mounted on a rotary table 68 so that the downline velocity of the tube 16 and the rotation of the tube 16 can be independently controlled by similar motion of the drive rollers 30. Separate motors are used to control downline velocity and rotation. A rotational motor 74 rotates the rotary table 68 through a drive chain 76 to provide rotational velocity. A drive motor 78 drives or rotates the drive rollers 30 through a drive belt (not shown) to provide downweb velocity.

The diameter constraining structure 24 is mounted on the frame 44 between the extrusion die 14 and the transport mechanism 28 and serves two important functions. It locates and aligns the tube 16 with the other components of the apparatus 10 and it controls expansion of the tube 16 to an outside diameter within a desired range after the tube 16 is formed by the extrusion die 14. The constraining structure 24 of the illustrated embodiments is cylindrical with both ends open to allow passage of the tube 16 through its interior. The constraining structure can also be elliptical or polygonal having a low aspect ratio as long as the circumference is nearly constant along the axis of the tube 16 in the region of the frost line 86. The constraining structure 24 is located to physically prevent excessive radial or lateral expansion of the blown film tube 16 in the region at and below the frost line 86, the line at which the flowable material of the tube solidifies. "Solidifies" is defined herein as the state change from a liquid to a solid phase. More precisely, the frost line 86 is the location where the tube film has cooled to a temperature at which the resistance of the film to further axial stretching is greater than the force exerted by the pressure difference between the interior and the exterior of the tube 16. Downline of the frost line 86, the tube 16 does not expand further.

Figure 3:
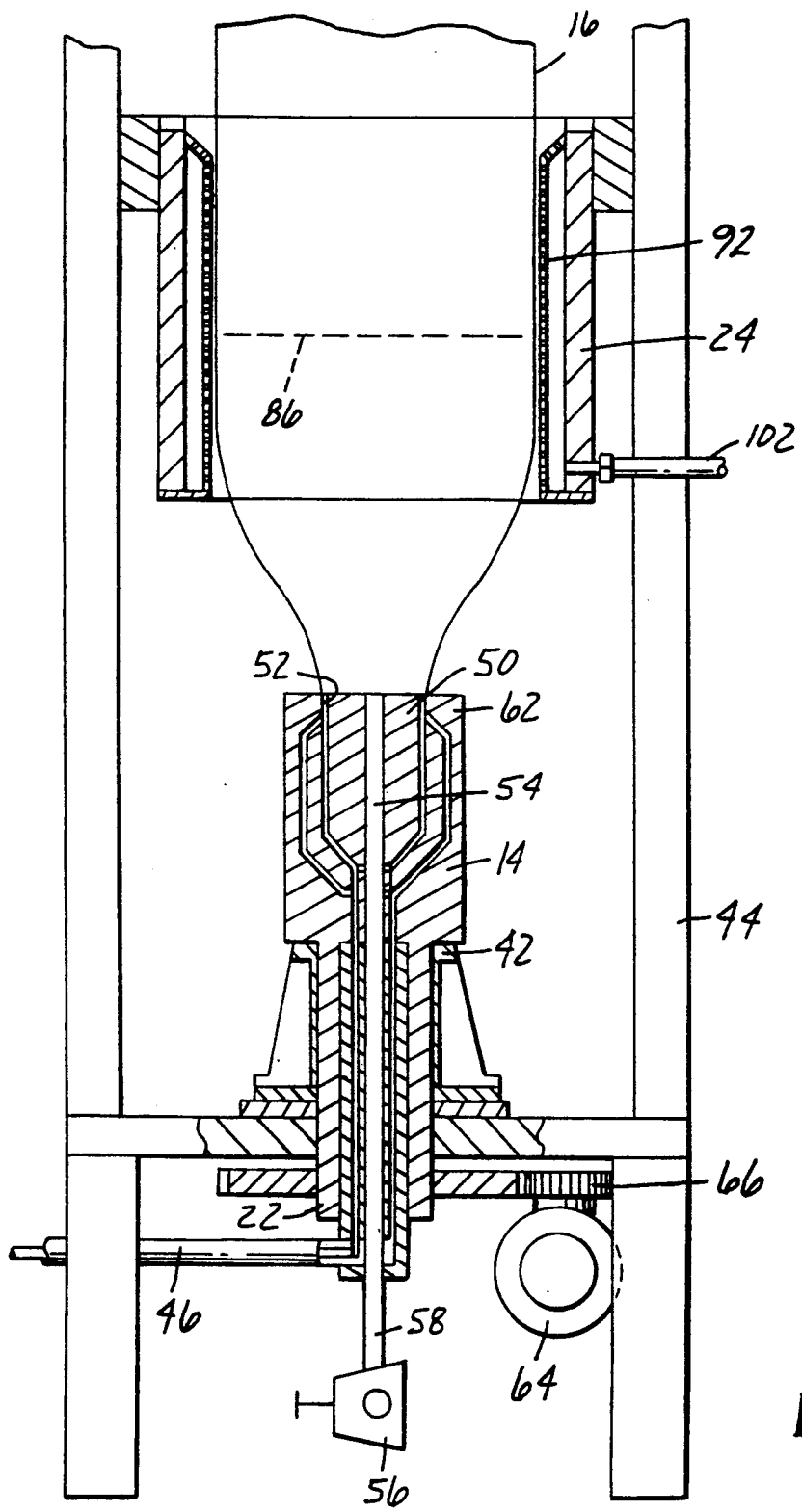
FIG. 3 is an enlarged front elevation view of the extrusion die and constraining structure of FIG. 2 with portions cut away to illustrate details.
Figure 4:
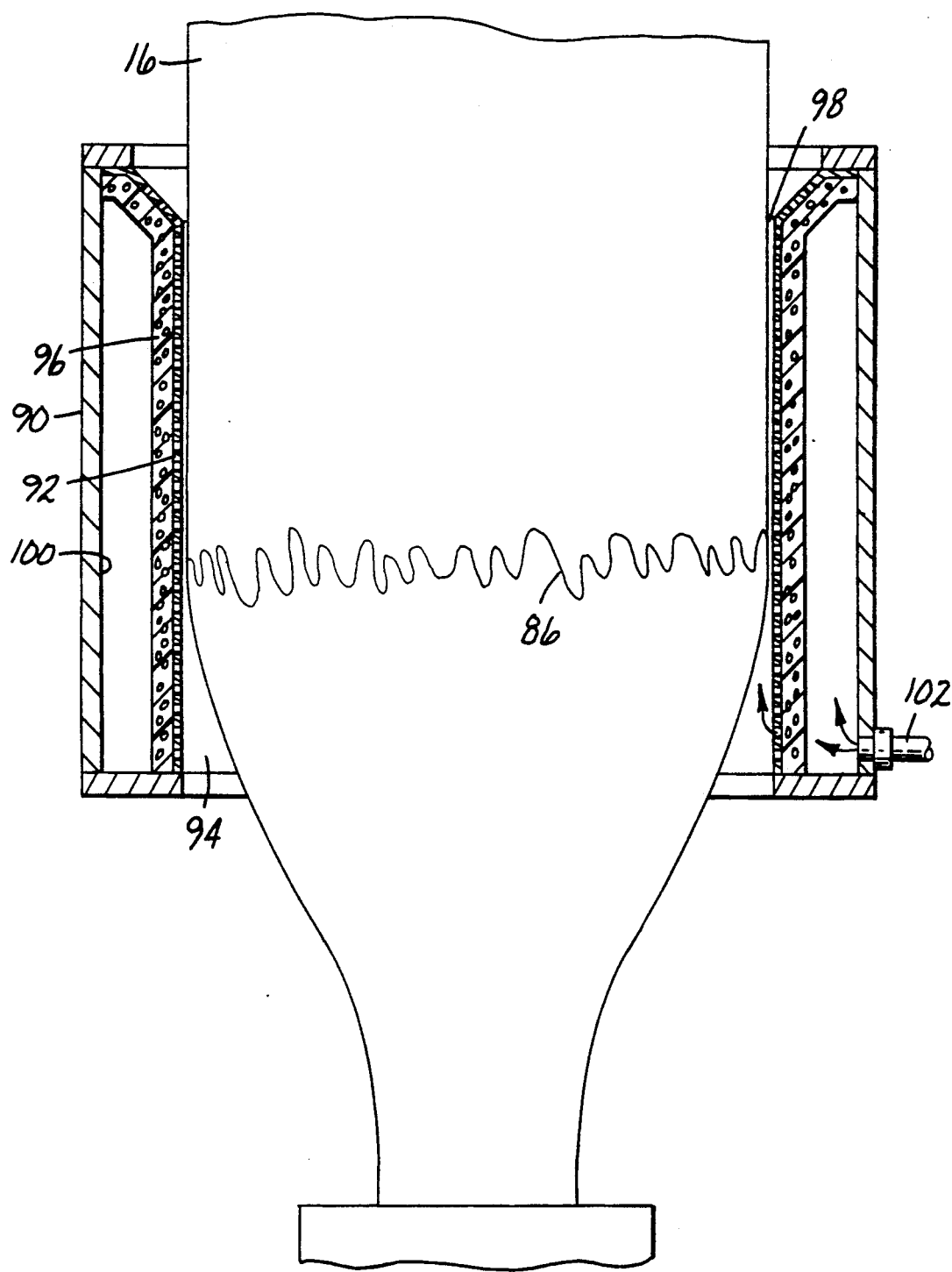
FIG. 4 is an enlarged cross-sectional view of the constraining structure of FIG. 3.

Referring to FIGS. 3 and 4, the constraining structure 24 is a cylindrical tube positioned downline of and concentric with the extrusion die 14 and includes a casing 90 and an annular sleeve 92 in the casing 90. The annular sleeve 92 has a generally cylindrical central passageway 94 which receives the tube 16 to permit movement of the tube 16 along its longitudinal axis in the downline direction, while physically restricting movement in the lateral direction. The height of the sleeve 92 is dependent on the amount of variability in process conditions experienced by the tube 16 but ranges, in most cases, from one to six tube radiuses. The frost line 86 of the tube 16 is contained between the top and bottom of the sleeve 92. The sleeve 92 has an inside diameter approximately equal to or slightly larger than the desired final tube diameter to form the passageway 94.

The sleeve 92 must allow the molten tube material to slide thereby without significant friction or grabbing action, and should therefore have a low coefficient of friction. The tube 16 is pressurized to reach a diameter which is close to the internal diameter of the sleeve 92. In the preferred embodiment, a surface or layer of pressurized air 98 is used. This air bearing layer 98 also serves as a diameter adjusting mechanism to increase or decrease the tube diameter by decreasing or increasing, respectively, the air pressure at the inner surface of the sleeve 92. In this embodiment, the sleeve includes walls 96 which define an air chamber 100 separate from the passageway 94. An air inlet 102 provides pressurized air to the air chamber 100 from a source of pressurized air (not shown).

The sleeve 92 is porous; the porosity permits air to pass through the sleeve walls 96 of the sleeve 92 from the air chamber 100 to the passageway 94 to form the air layer 98 along the inner surface of the sleeve 92. The air layer 98 is at a sufficiently large pressure to constrain the tube 16 to the desired outer diameter while the tube 16 solidifies and to prevent the tube 16 from contacting the sleeve 92 and creating surface defects on the tube 16. When portions of the tube 16 do expand toward the sleeve 92, air flow is restricted and the air pressure adjacent these portions increases to force the tube 16 laterally inwardly and away from the sleeve 92 and to stabilize the tube 16 within the central passageway 94. In the illustrated embodiments, the porous material of the sleeve walls 96 is a microporous material having a flow rate of approximately 5.49 LPM/cm$^2$ with a pressure drop of 9.95 kN/m$^2$ and a flow rate of approximately 13.2 LPM/cm$^2$ with a pressure drop of 29.85 kN/m$^2$. The microporous material can be a porous metal or plastic. However, other porous materials having various pore sizes can be used. Any size pores 104 can be used as long as the desired pressure drop is attained. The constraining structure 24 is a continuous porous inner surface having a single chamber. The air layer 98 is also a continuous surface rather than being formed of a plurality of separate air streams. This permits lower air flow rates to be used to form the air layer 98 and permits the use of a smaller gap between the constraining structure 24 and the blown tube 16. This results in a final tube diameter that is more uniform than known diameter adjusting devices because the tube 16 is held at a constant position during solidification. Also, a temperature profile within the constraining structure 24 can be provided.

Thus, the constraining structure 24 uses an air floatation principle based on the balance of three forces: the force created by the pressure in the area outside the tube 16, but inside the constraining structure 24; the force created by the pressure inside the tube 16; and the force from the tension in the polymer tube 16. The tube 16 will move to a distance from the constraining structure 24 that balances these three forces. Static pressure is used to push the tube 16 away until the three forces are balanced, rather than using a dynamic venturi effect to suck the tube 16 toward the constraining structure 24. It is also possible to push the tube 16 away from the interior of the constraining structure 24 by a fixed distance to increase cooling and production rates.

The constraining structure 24 can be mounted on the frame 44 relative to the extrusion die 14 such that the constraining structure 24 can be adjusted within a predetermined range to locate the frost line 86 within the central passageway 94. As long as the frost line 86 remains within the casing 90, a constant diameter tube 16 will be produced. The sleeve 92 has a length generally parallel to the central longitudinal axis of the passageway 94 of between one half and three times the diameter of the passageway 94.

Furthermore, in known systems process disturbances change the tube diameter. When using the constraining structure 24, process disturbances change only the shape of the tube 16 by forming its final diameter at an upline level and moving the frost line 86 downline. However, the diameter of the tube 16 does not change because the tube 16 is contained within the constraining structure 24. Large disturbances, such as pin holes, excess seal or nip leak, or film porosity, can be compensated for by using a simple on-off control system mounted at the base of the constraining structure 24 to monitor and control the tube shape by injecting or removing air from the tube 16. Alternatively, another simple control system can use the diameter measurement to compare air pressure to the air bearing layer 98 to finely control and adjust the diameter.

The constraining structure 24 therefore increases the tube diameter stability over existing reactive methods, and steadies the tube 16 and increases the accuracy of point to point diameter measuring systems. This constraining structure 24 can control blown film tube diameter to within very small ranges such as less than 0.5% of the tube diameter while permitting significant changes in process conditions.

Figure 5:
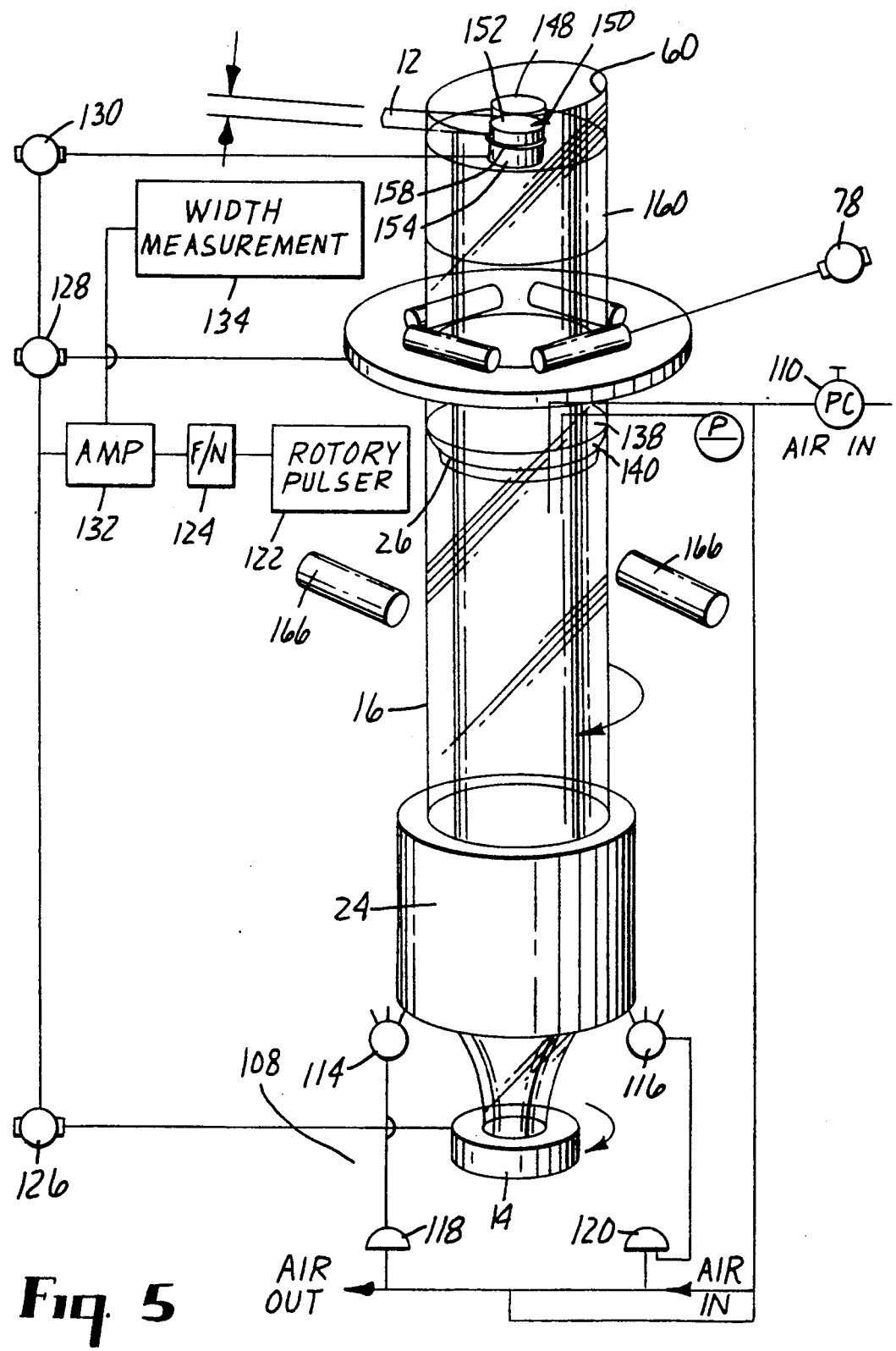
FIG. 5 is a schematic illustration of the tube sensing and controlling system of the apparatus of FIG. 2.

As illustrated in FIG. 5, a tube sensing and controlling system 108 senses a portion of the tube 16 before the tube 16 enters the passageway 94 of the constraining device 24 and monitors the shape of the tube 16. The tube sensing system 108 then provides a signal to a tube pressure regulator 110 which can be a proportional controller with a manual set point. Based on this signal, the tube sensing system 108 adjusts the air volume inside the tube 16 to move the frost line 86 and adjust the tube diameter when the sensed portion of the tube 16 varies from the desired range.

The tube sensing and controlling system 108 is optical, and includes a simple on-off control system using two infrared (IR) beam sensors 114, 116 mounted upline of the constraining structure 24 in the illustrated embodiments. The IR beam sensors 114, 116 monitor the shape of the tube 16 and send signals to the pressure regulator 110, which is manually set to a target pressure to adjust the air volume in the central longitudinal cavity 60 of the tube 16. The first IR beam sensor 114 senses when a portion of the tube 16 entering the passageway 94 has an outer diameter larger than a first predetermined size. The first IR beam sensor 114 then provides a feedback signal to solenoid valves 118 indicating the overly large outer diameter. The solenoid valves 118 then open to decrease air volume in the tube cavity 60. A second IR beam sensor 116 senses when the portion of the tube 16 entering the passageway 94 has an outer diameter smaller than a second predetermined size smaller than the first predetermined size. The second IR beam sensor 116 then provides a feedback signal to different solenoid valves 120 indicating the small diameter. In this case, the solenoid valves 120 open to increase air volume in the central cavity 60 of the tube 16. If either sensor 114, 116 continuously operates, then the target air pressure is set either too high or too low and the set point of the pressure regulator 110 should be manually adjusted.

A pulse generator 122 is connected to one roller 30 of the transport mechanism 28 and supplies a feedback signal to the digital controller of the drive motor 78 of the transport mechanism 28. This signal also is sent to a frequency to voltage (F/V) card 124 which supplies the reference voltage to servomotors 126, 128, and 130 which control the rotation of the die 14, transport mechanism 28, and tube cutter 34, respectively. The reference voltage for these servomotors 126, 128, 130 is trimmed or amplified by amplifier 132 to control the relation between the downline feed velocity and the rotational velocity and hence the slit width as measured by width measurer 134. The amount of trim or amplification is automatically adjusted around a set point to maintain a constant slit width.

The lip seal 26 is mounted on the frame 44 for sealing the cavity 60 of the tube 16 to prevent air from escaping through the open end of the cavity 60 and help control the pressure within the tube 16. The seal 26 is a disk-shaped object with an elastomeric outer lip.

The tube cutter 34 is mounted on the frame 44 downline of the transport mechanism 28 for cutting the tube 16 into a continuous elongate strip 12. The cutter 34 also defines the open end of the central cavity 60 of the tube 16, and the tube cutter 34 is offset at an angle with respect to the downline direction. The tube cutter 34 can use score, shear, or razor slitting systems, depending on the web material.

The apparatus 10 operates to produce an elongate strip of material 12 in the following manner. First, flowable material such as a polyolefin like polyethylene is extruded from extruders 20 and through the annular orifice of the rotating die 14 in a downline direction to form the open-ended tube 16 with a generally cylindrical central longitudinal cavity 60. As the tube 16 is formed, the central longitudinal cavity 60 of the tube 16 is pressurized with a fluid, preferably air, to expand the tube 16 laterally outwardly to a desired outer diameter within a predetermined range. The tube 16 is transported downline by the transport mechanism 28 which engages and pulls the tube 16, and rotates in synchronism with the extrusion die 14.

The position of the tube 16 and its outer diameter are controlled by moving the tube 16 through the diameter constraining structure 24 which does not rotate. The constraining structure 24 has an annular microporous sleeve 92 such that the tube 16 solidifies within the sleeve 92 with the desired outer diameter Pressurized air is forced through the microporous sleeve 92 into the central passageway 94 of the constraining structure 24 to form a thin layer of air 98 at a higher pressure than ambient air along the sleeve 92 which constrains the tube 16 therein. The thin air layer 98 formed along the inner surface of the sleeve 92 is at a sufficiently large pressure to constrain the tube 16 to the desired outer diameter while the tube 16 solidifies and to prevent the tube 16 from contacting the sleeve 92. The air pressure increases adjacent portions of the tube 16 which expand toward the sleeve to restrict air flow to force the tube 16 laterally inwardly and away from the sleeve 92 to stabilize the tube 16 within the central passageway 94.

The outer diameter of the portion of the tube 16 prior to entering the constraining structure passageway 94 is sensed to adjust the air pressure inside the tube 16 to expand or contract the tube 16 when the sensed portion of the tube 16 varies from the desired range. This is accomplished by the optical sensing devices 114, 116 which optically sense when the outer diameter of the tube 16 entering the passageway 94 is larger than a first predetermined size or smaller than a second predetermined size. A feedback signal is provided to lower air pressure within the tube 16 when the outer diameter is larger than the first predetermined size and to increase air pressure when the outer diameter is smaller than the second predetermined size.

After passing through the constraining structure 24, the tube 16 is pulled over the lip seal 26 which maintains the pressure in the upline section of the tube 16, while allowing controlled access through passageways in the seal 26. Finally, the tube 16 floats over the air bearing mandrel 32 and is then cut with a cutter 34 into a continuous elongate strip 12 at an angle offset from the downline direction. The rotational velocity of the the extrusion die 14, the transport mechanism 28, and the cutter 34, and the downweb speed of the tube 16 are controlled by the sensing and controlling system 108 to vary the width of the elongate strip 12.

Numerous characteristics, advantages, and embodiments of the invention have been described in detail in the foregoing description with reference to the accompanying drawings However, the disclosure is illustrative only and the invention is not intended to be limited to the precise embodiments illustrated. Various changes and modifications may be effected therein by one skilled in the art without departing from the scope or spirit of the invention.

We claim:

1. A method of producing an elongate strip of material comprising the steps of:
   extruding flowable material through an annular die orifice in a downline direction to form an open-ended tube with a generally cylindrical central longitudinal cavity;
   pressurizing the central longitudinal cavity of the tube with air to expand the tube laterally outwardly to an outer diameter within a predetermined range;
   transporting the tube downline with a transport mechanism including at least one drive roller engaging and pulling the tube;
   cutting the tube with a cutter into a continuous elongate strip at the open end at an angle offset from the downline direction, wherein the tube remains open and in tube form until the tube is cut;
   providing relative rotation between the tube and the cutter such that the cutter cuts the tube into a continuous strip of a desired width as the tube moves downline by rotating the extrusion die and transport mechanism together to rotate the tube relative to the cutter;
   preventing escape of the pressurizing fluid through the open end of the cavity; and
   moving the tube in the downline direction through an annular sleeve such that while the tube is within the annular sleeve it reaches its final size before solidifying with an outer diameter within the desired range.

2. The method of claim 1 wherein the annular sleeve is microporous and includes a central passageway and the method further comprises the steps of:
   forcing pressurized gas through the microporous sleeve into the central passageway to form a thin layer of gas at a higher pressure than ambient air along the microporous sleeve; and
   constraining the portion of the tube within the passageway with the thin layer of gas, wherein the sleeve has a sufficiently large porosity which permits gas to pass through the sleeve from the gas chamber to the passageway, the gas forming a gas layer along the inner surface of the sleeve at a sufficiently large pressure to constrain the tube to the desired outer diameter while the tube solidifies and to prevent the tube from contacting the sleeve, and the sleeve has a sufficiently low porosity that the gas pressure increases adjacent portions of the tube which expand toward the sleeve to restrict gas flow to force the tube laterally inwardly and away from the sleeve to stabilize the tube within the central passageway.

3. The method of claim 2 further comprising the step of sensing a portion of the tube before the tube enters the passageway and providing a signal to adjust the gas pressure inside the tube to expand or contract the tube when the sensed portion of the tube varies from the desired range.

4. The method of claim 3 wherein the step of sensing a portion of the tube comprises the steps of:
   optically sensing a portion of the tube when the outer diameter of the tube entering the passageway is larger than a first predetermined size and providing a feedback signal to lower air pressure within the tube when the outer diameter is larger than the first predetermined size; and
   optically sensing a portion of the tube when the outer diameter of the tube entering the passageway is smaller than a second predetermined size smaller than the first predetermined size and providing a feedback signal to increase air pressure within the tube when the outer diameter of the tube is smaller than the second predetermined size.

5. The method of claim 1 further comprising the step of positioning the annular sleeve relative to the extrusion die such that the tube material solidifies within the passageway.

6. A constraining structure which controls expansion of an extruded blown film tube to a desired outer diameter range after the tube is formed, the constraining structure comprising:
   a casing positionable around the tube;
   an annular sleeve in the casing having a generally cylindrical central passageway adapted to receive the tube to permit movement of the tube along its longitudinal axis in a downline direction, the casing and the sleeve having low friction walls, wherein while the tube is within the annular sleeve it reaches its final size before solidifying with an outer diameter within the desired range; and
   means for controlling the size of the tube between both upper and lower limits.

7. The constraining structure of claim 6 wherein the controlling means comprises a gas chamber, defined by the casing and the sleeve walls, separate from the passageway; and the constraining structure further comprises a gas inlet for providing pressurized gas to the gas chamber from a source of pressurized gas; wherein the sleeve has a sufficiently large porosity which permits gas to pass through the sleeve from the gas chamber to the passageway, the gas forming a gas layer along the inner surface of the sleeve at a sufficiently large pressure to constrain the tube to the desired outer diameter while the tube solidifies and to prevent the tube from contacting the sleeve, and the sleeve has a sufficiently low porosity that the gas pressure increases adjacent portions of the tube which expand toward the sleeve to restrict gas flow to force the tube laterally inwardly and away from the sleeve to stabilize the tube within the central passageway.

8. The constraining structure of claim 6 wherein the sleeve is made of a microporous material having a flow rate of approximately 5.49 LPM/cm$^2$ with a pressure drop of 9.95 kN/m$^2$ and a flow rate of approximately 13.2 LPM/cm$^2$ with a pressure drop of 29.85 kN/m$^2$.

9. The constraining structure of claim 6 further comprising tube sensing means for sensing a portion of the tube before the tube enters the passageway and tube pressurizing means for pressurizing the tube to adjust the tube volume inside the tube to adjust the tube diameter when the sensed portion of the tube varies from the desired range, wherein the tube sensing means provides a signal to the tube pressurizing means to cause the tube pressurizing means to operate.

10. The constraining structure of claim 9 wherein the tube sensing means comprises:
    first optical sensing means for sensing a portion of the tube when the outer diameter of the tube entering the passageway is larger than a first predetermined size and for providing a feedback signal to the tube pressurizing means when the outer diameter is larger than the first predetermined size; and second optical sensing means for sensing a portion of the tube when the outer diameter of the tube entering the passageway is smaller than a second predetermined size smaller than the first predetermined size and for providing a feedback signal to the tube pressurizing means when the outer diameter of the tube is smaller than the second predetermined size.

11. The constraining structure of claim 6 further comprising positioning means for adjustably mounting the constraining structure relative to the extrusion die such that the constraining structure can be adjustably positioned within a predetermined range in the upline or downline directions so that the tube solidifies within the passageway of the casing, the sleeve having a length generally parallel to the central longitudinal axis of the passageway of between one half and three times the diameter of the passageway.

* * * * *